Jan. 5, 1971 W. D. PRICER 3,553,658

ACTIVE STORAGE ARRAY HAVING DIODES FOR STORAGE ELEMENTS

Filed April 15, 1968 3 Sheets-Sheet 1

INVENTOR
WILBUR D. PRICER

BY Theodore E. Galanthay
AGENT

United States Patent Office 3,553,658

Patented Jan. 5, 1971

3,553,658

ACTIVE STORAGE ARRAY HAVING DIODES FOR STORAGE ELEMENTS

Wilbur D. Pricer, Poughkeepsie, N.Y., assignor to International Business Machines Corporation, Armonk, N.Y., a corporation of New York Filed Apr. 15, 1968, Ser. No. 721,324

Int. Cl. G11c *11/36*

U.S. Cl. 340—173 11 Claims

ABSTRACT OF THE DISCLOSURE

In data processing systems, a volatile storage array including diode pairs as storage elements, for storing digital signals. Information is written into the storage array by charging or discharging storage elements. Information is sensed by detecting the amount of charge in a storage element, since the junction capacitance varies with the amount of charge. The entire array may be block-reset by a source of light.

BACKGROUND OF THE INVENTION

My invention relates to a storage for digital signals. More specifically, my invention relates to an active storage array consisting entirely of diode pairs as storage elements, with means for nondestructive read-out and block-resetting.

Briefly, numerous storage means for storing digital signals are known in the art. It has been long known to use ferrite cores, tunnel diodes, magnetic films, electronic registers, and other bistable circuit means for storing digital information, i.e. "1's" and "0's" The design of a storage system is governed by considerations such as cost, speed, size, capacity, and even power consumption.

The cost factor is strongly affected by the cost of each storage element which in turn is determined by the ease of fabrication and testing in mass production. One type of diode which meets this cost criteria and can be used with my invention is described in pending application S.N. 697,911, filed on Jan. 15, 1968, by D. W. Boss et al. Although the speed of storage system increases by improvements in state of the art circuitry, it is further enhanced by features such as block-resetting and non-destructive read-out. The over-all size of a storage array (frequently critical) is directly affected by the size of each storage element. Lastly, factors such as ruggedness and power consumption have become important with an increase in the number of satellite, airborne and other portable computers. The amount of power consumed is not only critical because the available power might be limited, but also because the more power a storage unit requires, the more heat it will generate, thereby requiring additional cooling. For these reasons, there is continual intensive activity to provide storage systems having as many of the above cited advantageous characteristics as possible.

SUMMARY OF THE INVENTION

Accordingly, it is an object of my invention to provide an inexpensive digital storage consisting entirely of diode pairs for storage elements.

Another object of my invention is to provide a digital storage having low power consumption.

A still further object of my invention is to provide a fast digital storage having means for block-reset and non-destructive read-out.

A specific object of my invention is to block-reset a digital storage by light impinging on all of the storage elements in a block or segment of storage.

In accordance with one aspect of my invention, a plurality of diode pairs are joined in a storage array. Each diode pair can be represented as two diodes joined anode to anode or cathode to cathode, and can be referred to as back-to-back diodes. In practice, such a diode pair can be fabricated as a single semiconductor device; the center junction of such a diode pair being inaccessible.

For purposes of illustration, assume a storage element such that the diodes are joined at their cathodes. In order to store digital information, it is necessary to cause a storage element to assume one of two distinguishable electrical states, i.e. a "zero" or a "one." In order to write a "one," either accessible terminal of the storage element is held at a fixed potential while the other is pulsed positive relative to the former, thereby causing one of the diodes to conduct momentarily. When the pulse is removed a net charge is stored on the composite junction capacitance of the two diodes. Assuming that these two diode have a leakage resistance of $10^{10}$ ohms, and a composite capacitance of $5\times10^{-12}$ farads, the charge must be replenished approximately 100 times a second as determined by the RC time constant of 50 milliseconds. Under ideal mathematical conditions, it would be sufficient to replenish the charge 20 times a second in the case of an RC time constant 50 milliseconds. In practice however, due to variations in component characteristics, for example, a greater rate of recharging is required. In accordance with the above, a digital storage convention can be defined such that the presence of a charge indicates a "one" while the absence of a charge indicates a "zero." In the alternative, the use of two storage elements per bit allows a digital storage convention to be defined in terms of a difference in the degree of charge.

In some applications such as the slow write fast read storages used in emulators, the ability to write only "1's" is sufficient. In most applications, however, it is necessary to write new information more rapidly than the old information would naturally decay away. Therefore, in accordance with my invention, each storage element can be reset, either by light or an electrical signal.

Resetting by light energy is accomplished simply by causing light to impinge on the storage elements of the array. The rate of charge decay is drastically increased by exposing the diode junctions to light. This technique allows the system to reset as large block of bits as the light conveniently covers. In the alternative, if it is desired to reset only a portion of the storage array, the light source can be caused to impinge on only selected portions of the storage array.

Resetting electrically is accomplished by the application of a pulse which causes a Zener breakdown in one of the diodes in the pair. For this, it is necessary that the two diodes in the storage element exhibit substantially different capacitances, e.g. a three-to-one ratio of capacitance.

In accordance with my invention, the information may be sensed either destructively or in the non-destructive mode. Destructive sensing is accomplished by monitoring the current drawn by a storage element during either conventional or Zener breakdown. If the charge being stored differs from the charge which was previously stored, the current drawn differs in both amplitude and wave shape from when the charges are the same.

The ratio between "one" and "zero" signals can be further improved by using two storage elements per stored bit and sensing with a differential amplifier. The use of two storage elements per stored bit permits sensing in the non-destructive mode. Non-destructive sensing is based on the fact that the capacitance of each diode in a pair is directly altered by the charge stored mutually by them. When two storage elements per stored bit are used, the information content is determined by a difference in the amount of charge contained in each of the two elements. Thus, when a pulse insufficient to cause breakdown is supplied to both storage elements, two signals of differing amplitude appear on the sense lines. In summary, I have disclosed an inexpensive, fast, digital storage, with means for block resetting and non-destructive read-out, wherein the storage elements consist entirely of diode pairs.

The foregoing and other objects, features and advantages of my invention will be apparent from the following and more particular description of preferred embodiments of the invention, as illustrated in the accompanying drawings.

DESCRIPTION OF THE PREFERRED EMBODIMENTS

Figure 1:
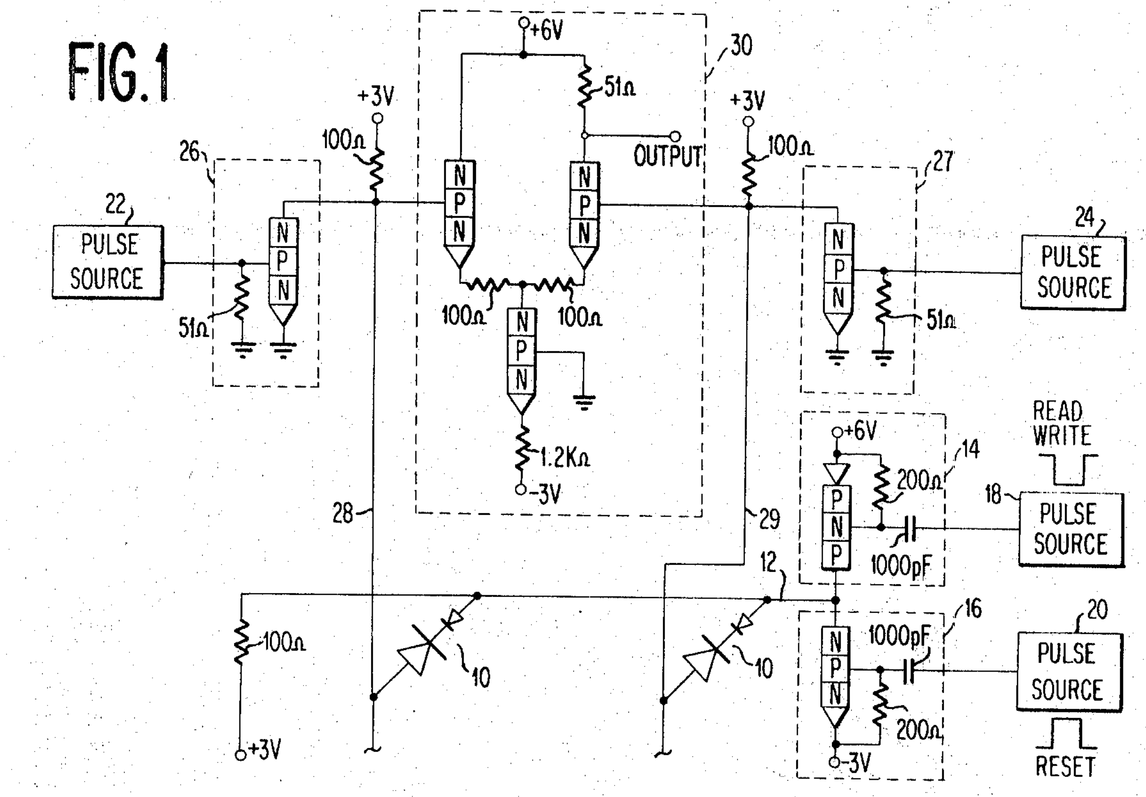
FIG. 1 is a circuit diagram of a preferred embodiment of my invention utilizing two storage elements per bit.

Refer now to FIG. 1 for a circuit diagram in accordance with my invention. This particular embodiment uses two storage elements 10. Word line 12 is connected to each of said storage elements 10, and also to a bipolar driving circuit consisting of word driver 14 and reset driver 16. Circuits 14 and 16 receive input pulses from pulse sources 18 and 20 in accordance with the timing and addressing scheme of the over-all system. For purposes of describing my invention, it is sufficient to consider pulse sources 18 and 20 as a means for activating one of circuits 14 or 16, which in turn supplies pulses to word line 12, thereby affecting the degree of charge in storage elements 10.

Pulse sources 22 and 24 similarly provide pulses to bit drive circuits 26 and 27, respectively, when it is desired to activate one of bit lines 28 or 29 for charging one of storage elements 10. Differential sense amplifier 30 is connected to both storage elements 10. As will be explained in greater detail later, it is the function of sense amplifier 30 to detect which of bit lines 28 or 29 has the larger pulse, in response to a read pulse on word line 12.

The specific interconnection of components in circuits 14, 16, 26, 27, and 30 is shown in detail in FIG. 1. Analogous circuits will immediately suggest themselves to those skilled in the art. Variations in the values of resistance, capacitance, and bias voltage are determined by the characteristics of the transistors and storage elements 10 that are used. The particular values shown in FIG. 1 are for storage elements in which the Zener breakdown voltage of the smaller diode of each diode pair is approximately 6 volts. The larger of the diodes in each diode pair does not break down.

Figures 3, 4, 5, 6, 7:
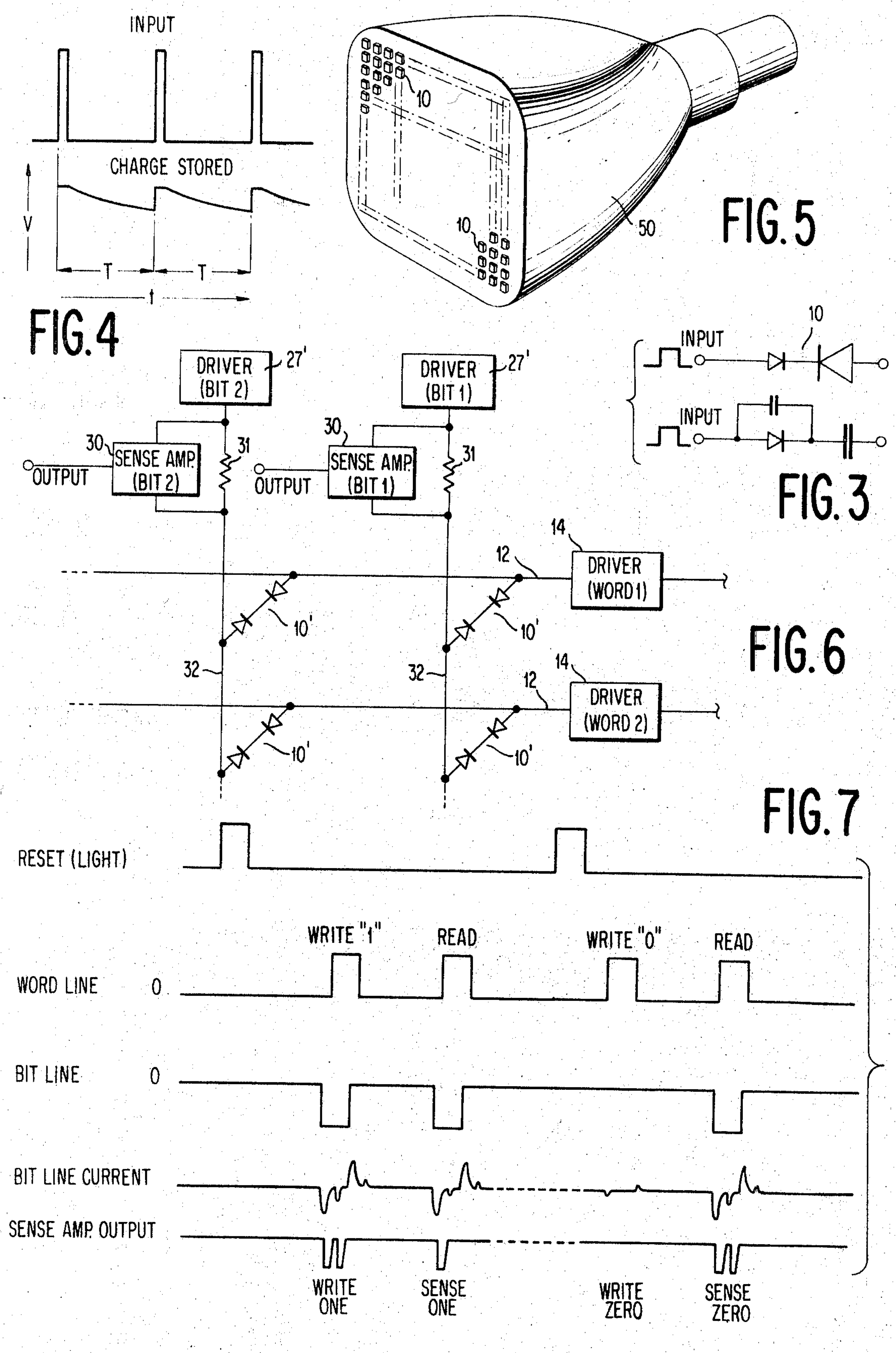
FIG. 3 is a single storage element and its equivalent circuit.
FIG. 4 is a timing diagram descriptive of a regeneration cycle.
FIG. 5 is a schematic representation of one means for performing a block-reset.
FIG. 6 is an alternate embodiment of my invention having one storage element per stored bit.
FIG. 7 is a waveform diagram indicating the operation of the circuit in FIG. 6.

Referring now to FIG. 3, there is shown a storage element 10 with its corresponding equivalent circuit. As shown, the larger diode of the pair essentially acts as a capacitor. In practice, several diodes (e.g. three) can be placed in parallel to form the equivalent of the diode with the larger capacitance. In this case, a three-to-one ratio of capacitance would result. With reference to the equivalent circuit, the smaller diode of the pair acts as a diode in parallel with a small capacitance which is negligible. Accordingly, a positive pulse input on the left side of storage element 10 will cause a charge to be stored at the junction of the diode pair. The charge thus stored must be regenerated periodically as shown in the waveform of FIG. 4. Assuming that the two diodes have a leakage resistance of $10^{10}$ ohms, and a composite capacitance of $5\times10^{-12}$ farads, the charge must be replenished approximately 100 times a second, as previously explained. Therefore, a time period T in FIG. 4 is approximately 10 milliseconds, according to my specific example, and less than 1% of the storage's time is spent in regeneration. This regeneration time does not necessarily degrade system performance. It may often be scheduled when the storage is normally idle.

Resetting of the storage can be accomplished both electronically and by light. With reference to FIG. 5, see one means of block resetting the storage by light. The rate of charge decay of storage elements 10 is drastically increased by exposing the junctions to light. The embodiment of FIG. 5 allows resetting of as large a block of storage elements as desired. For example, the entire matrix can be reset, or else cathode ray tube 50 can be used to selectively scan only one line or several lines. Those skilled in the art will recognize that a CRT tube 50 can display various patterns, which would be the exact pattern of bits reset. As an alternative, storage elements 10 can be positioned inside the CRT tube 50 such that selected blocks are directly showered with electrons. Block resetting can be accomplished even more rapidly with better spectrum matching using a solid state source such as GaAs. An economically most attractive alternative is exposing the storage elements to be reset to light produced by a neon tube.

Referring now to FIG. 6 and with continued reference to FIG. 1, an alternate embodiment of my invention is shown. Corresponding circuits have been labeled with corresponding numerals. The storage has been expanded to two words and two bits per word. At the same time, only one storage element 10′ is used per bit. Storage elements 10′ are shown consisting of two identical diodes in each pair. The element shown in FIG. 3, however, may also be used. In the embodiment of FIG. 6, two word lines 12 and two bit lines 32 are shown. This storage is reset to the zero state by a source of light. "1's" may then be written into storage elements 10′ by simultaneous activation of a desired word line 12 by one of drivers 14 and a desired bit line 32 by one of drivers 27′. Subsequent activation of a word line 12 will result in an output from sense amplifiers 30.

Figure 8:
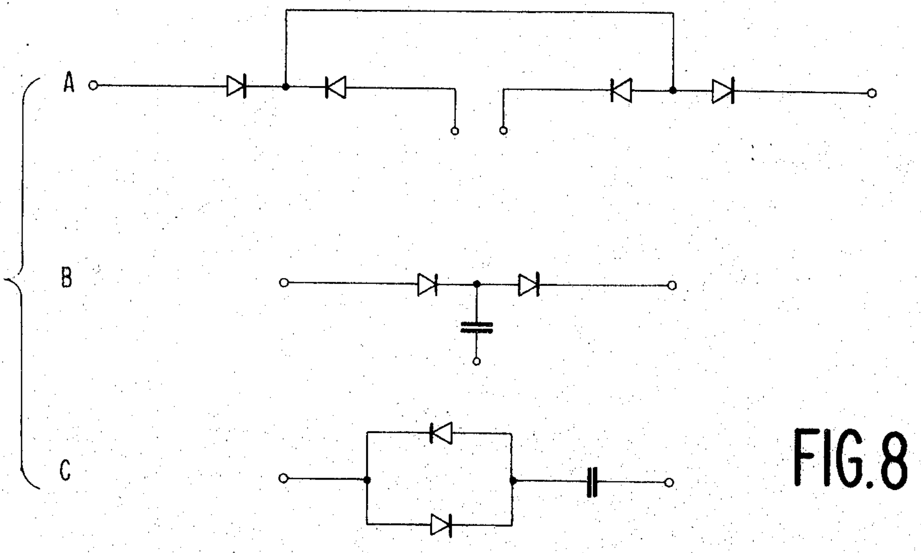
FIG. 8 is another embodiment of a single storage element and its equivalent circuits.

An alternate embodiment for storage elements is shown in FIG. 8. A storage element is shown in FIG. 8*a* with its corresponding equivalent circuits in FIGS. 8*b* and 8*c*. The storage element of FIG. 8 can be used as an alternative, in constructing a storage matrix in accordance with my invention. For example, the storage element of FIG. 8*c* can be directly substituted for storage element 10 in FIG. 1 with the following changes in voltage drive levels.

Drive lines 28, 29 and 12 are held quiescently at +1 volt. During reset word line 12 is driven to ground. During writing, word line 12 is driven to +1.5 volts and either bit line 28 or 29 is driven to +½ volt. Reading is accomplished destructively by monitoring bit line signals during reset.

Figure 9:
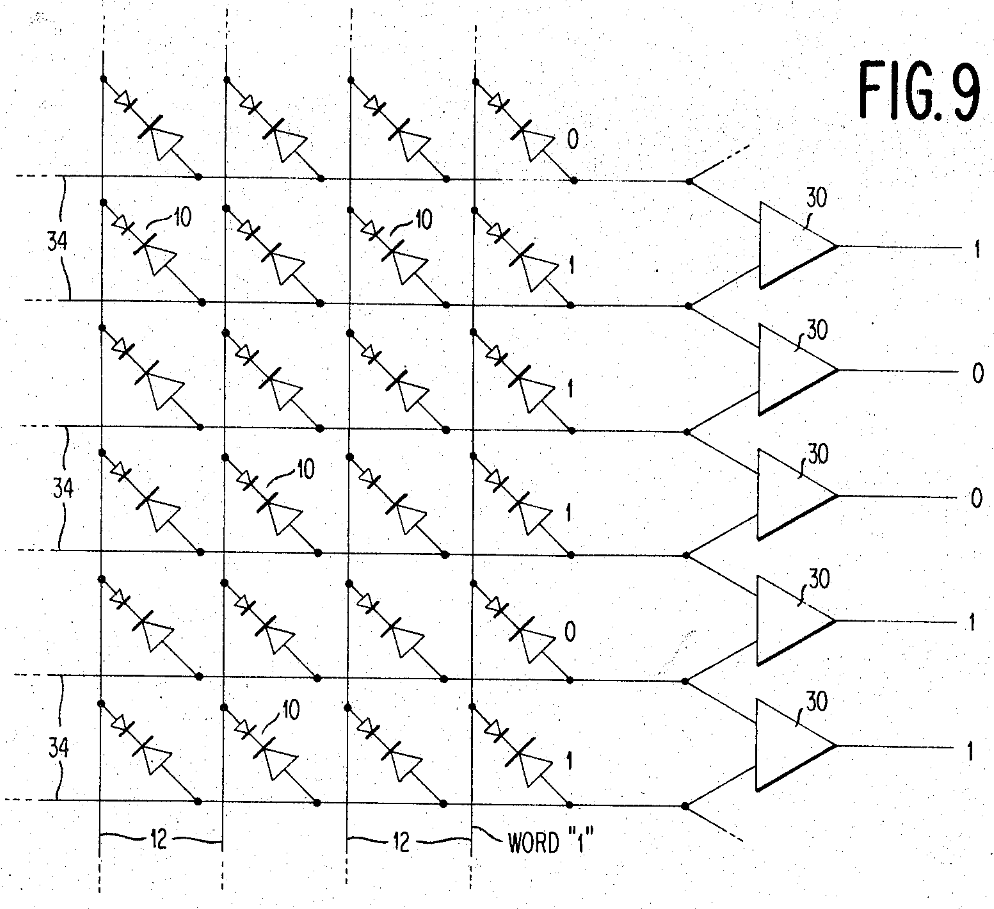
FIG. 9 is still another alternate embodiment for a storage matrix.

In order to improve on the embodiment of FIG. 6, so that two adjacent storage elements are sensed by a differential amplifier, in order to sense one bit of data, a storage matrix can be constructed in accordance with the embodiment shown in FIG. 9. FIG. 9 shows adjacent bit/sense lines 34 connected to adjacent sense amplifiers 30. Storage of "1's" is accomplished by placing different signals in adjacent storage elements 10 in any given word. "0's" are stored where adjacent elements store the same charge. For purposes of illustration, word "1" has been illustrated in FIG. 9. Assuming that the five bit word 10011 (as shown) is to be stored, then the storage elements in word "1" are charged as indicated in FIG. 9. In this way, five bits may be sensed by differential amplifiers and only six storage elements are needed. In other words, instead of using two storage elements per bit as in FIG. 1, only one more storage element is needed than the number of bits contained in a word. In all the preceding embodiments, those skilled in the art will understand that the number of words stored in any matrix, as well as the number of bits per word can be expanded as desired.

DESCRIPTION OF THE OPERATION

In operation, the charge contained in each of the storage elements in a storage array constructed in accordance with my invention, is selectively varied and sensed for purposes of storing and retrieving digital information. The binary sensing means 30, in FIG. 1, relies on a variation in the capacitance of the storage elements as an inverse function of the amount of charge held by them. With reference to FIG. 1, when a pulse is supplied to word line 12, two signals of differing amplitude appear on the sense lines where the capacitance of storage elements 10 differ. The respective currents are described by the following formula:

$$I_1=C_1\left(\frac{dv}{dt}\right) \qquad I_2=C_2\left(\frac{dv}{dt}\right)$$

A difference amplifier with a ten-to-one common mode rejection is sufficient to detect the difference between a one and a zero as long as $C_1$ differs from $C_2$ about 30%.

Figure 2:
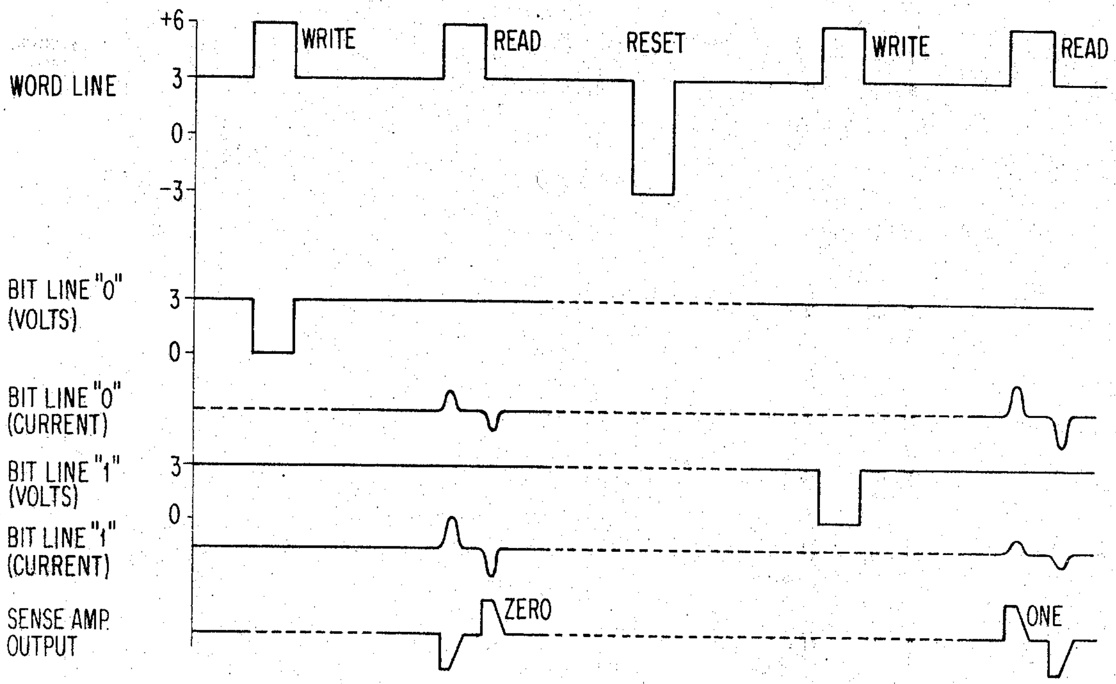
FIG. 2 is a timing diagram descriptive of the operation of the circuit in FIG. 1.

With continued reference to FIG. 1, also refer to FIG. 2 for a description of the operation of my invention. As previously described, storage elements 10 can be reset by a source of light. They can also be reset by a reset pulse from reset driver 16. With neither "0" bit drive 26 nor "1" bit drive 27 activated, bit lines 28 and 29 are at approximately +3 volts. Activation of reset driver 16 by a pulse from pulse source 20 causes the transistor in said reset driver circuit to conduct momentarily thereby establishing a voltage of approximately −3 volts on word line 12. In this way, a potential of 6 volts is established across storage element 10 causing the smaller of the two diodes in each diode pair to break down in the reverse direction (Zener breakdown). At the completion of the reset pulse, word line 12 returns to approximately +3 volts, its bias level. Word line 12, as well as bit lines 28 and 29 are now at +3 volts causing the inaccessible junction of elements 10 to also be at approximately +3 volts.

With continued reference to FIGS. 1 and 2, assume that a reset operation, either by light or an electrical pulse, has just been completed and it is desired to write a "0" into storage. This requires that a charge be placed on the storage element connected to "0" bit line 28 but not on the storage element 10 connected to "1" bit line 29. A pulse from pulse source 22 causes the transistor in bit drive circuit 26 to conduct, thereby establishing a voltage equal to approximately 0 on bit line 28. Simultaneously, a pulse from pulse source 18 causes the transistor in driver circuit 14 to conduct raising voltage on word line 12 to approximately +6 volts. In this way, a potential of +6 volts is established across the storage element 10 corresponding to a "0," thereby raising the voltage at its central node to aproximately 8 volts after the drivers return to 3 volts. At the same time a voltage difference of only 3 volts is established across the storage element corresponding to a "1" bit thereby raising the voltage at its central node to approximately 5 volts. As the voltage of bit line 28 and word line 12 return to +3 volts, storage elements 10 maintain a charge of approximately +8 volts and +5 volts respectively.

To read the information ("0") contained in the storage elements, it is merely necessary to provide a pulse by pulse source 18 causing the transistor in driver circuit 14 to conduct thereby causing a pulse from +3 to +6 volts on word line 12. This voltage change is insufficient to change the voltage held by either of the storage elements 10. Each of storage elements 10, however, acts as a capacitor transferring current spikes to bit lines 28 and 29 in response to the positive and negative slopes of the pulse on word line 12. The size of the spikes is inversely proportional to the value of the capacitance of each of storage elements 10. As previously mentioned, the capacitance of each of storage elements 10 varies inversely with the amount of charge stored by each of them. For this reason, the storage element 10 at approximately 8 volts has a lower value of word line to bit line capacitance than the storage element connected to bit line 29 storing approximately 5 volts. For this reason, the spikes on "0" bit line 28 will be smaller than the spikes on "1" bit line 29. Subtracting the voltage on "1" bit line 29 from the voltage on "0" bit line 28 results in a sense amplifier output as indicated in FIG. 2, which by my convention represents a "0."

Next on the timing diagram is shown an electronic resetting operation by causing word line 12 to drop from +3 to −3 volts resetting the storage elements 10 by a Zener breakdown in the smaller of the two diodes as explained above. If it is desired to now write a "1" the bit line for "1" bits (bit line 29) is lowered to ground potential simultaneously to raising the voltage level of word line 12 to +6 volts. This causes a charge on storage elements 10 which is exactly reversed from the condition for storing a "0" bit. In this way a read pulse on word line 12 causes the waveforms on bit lines 28 and 29 as indicated in FIG. 2, resulting in a differential sense amplifier output indicating a "1." Those skilled in the art will recognize that the waveforms chosen to indicate the difference between a "0" and a "1" are merely a matter of choice. Also, it is readily apparent that constructing storage elements 10 so that they are joined at their anodes instead of their cathodes requires merely that the polarity of the pulses on lines 12, 28, and 29 be reversed.

As previously discussed, the storage array of my invention is volatile requiring that the digital information be periodically reinserted by recharging the storage elements. Driver circuit 14 (FIG. 1) which inserts digital information into storage elements 10 is also used to reinsert the information in response to signals from pulse source 18. Referring now to FIG. 3, there is shown a storage element with its equivalent circuit. The larger diode of the pair acts primarily as a capacitor, and both diodes have a high resistance in the reverse direction. In response to an input pulse as shown, a charge is stored at the central node of the diode pair in accordance with the waveforms in FIG. 4. With further reference to FIG. 4, it is seen that as soon as the input voltage is removed, the charge in the storage cell begins to decay. The decay rate of a storage element is determined by the value of capacitance and resistance in the storage element. Obviously, with improved devices, the decay rate is extended over longer periods of time. The voltage stored in the storage cell can be allowed to decline, as long as it is sufficient to vary the capacitance of the storage cell by a minimum desired amount. As soon as a critically low level of voltage is reached, the storage cell must be recharged in order to reinsert the desired information. The rate of recharging the storage element must therefore be greater than the rate at which the charge in said storage element decays to a critically low level.

The storage can be reset by means of light as shown in FIG. 5. Storage elements 10 are distributed on the face of cathode ray tube 50. Light from the cathode ray tube 50 impinging on all the storage elements will reset the entire storage matrix. Light impinging on only selected ones (or selected pairs in the event two elements are used per bit as in FIG. 1) will selectively discharge the elements in the storage matrix, thereby selectively resetting said storage.

The operation of the embodiment shown in FIG. 6 is similar to that of the embodiments in FIG. 1 except that only one storage element 10' is required per bit. Therefore, instead of a pair of bit lines, for each bit, only one bit line 32 is required for each bit. In the same way, only one bit driver 27' is required per bit. Each bit still requires one sense amplifier 30. Each of the differential sense amplifiers is connected across a resistor 31 as shown, to detect the amount of current on the bit line.

With continued reference to FIG. 6, refer now to FIG. 7 for a more detailed description of the operation of the FIG. 6 embodiment. Diodes of equal size have been used in diode pairs 10' merely as an alternative. Storage elements 10 as shown in FIG. 3 could also be utilized. The storage matrix as shown can be reset by light, bringing the junction voltages to ground potential, as long as word lines 12 and bit lines 32 are also at ground potential. In order to write a "1" into storage, word line 12 is made positive while the corresponding bit line 32 is brought negative. In practice, the bit line 32 is brought negative slightly before word line 12 is brought positive.

When the word line is brought positive, a current is drawn through resistor 31, charging storage element 10'. Reading from storage element 10' is by destructive readout by application of pulses identical to those for writing a "1." Since storage element 10' is already charged to a positive potential, relatively little current is drawn by the bit line, thereby providing a relatively negligible sense amplifier output when the word line is brought positive. For this embodiment, sense amplifier 30 should be constructed non-linear so that it responds only to negative signals greater than a predetermined threshold level thereby providing an output as shown in FIG. 7.

With continued reference to FIG. 7, writing a "0" is accomplished in the following manner. In those storage locations in which it is desired not to write a "1," the corresponding bit line 32 is maintained at ground potential. In this way, a charge stored in storage element 10' is negligible. Therefore, when the read operation, as described above, is performed, a relatively large output is provided by sense amplifier 30.

Refer now to FIG. 9 showing an embodiment utilizing one more storage element than the number of bits stored per word. This is a compromise between the FIG. 1 and FIG. 6 embodiments. Thus, a five bit word is shown contained in six storage elements. Assuming word 1 consists of five bits: 10011, corresponding storage elements should be charged as shown in FIG. 9, i.e., 011101. Reading, writing, and sensing the FIG. 9 embodiment is by a combination of pulses as described in the FIG. 1 and FIG. 6 embodiments. For this embodiment, sense amplifier 30 is constructed in three stages such that the first stage is a linear difference amplifier, the second stage is a full wave rectifier, and the third stage is a threshold circuit.

In conclusion, I have described a volatile storage array having diode pairs as storage elements, for storing digital signals. Several embodiments have been described using either one storage element per bit, two storage elements per bit or a number of storage elements slightly greater than the number of bits to be stored. Information can be sensed by either detecting the amount of charge in a storage element, or by detecting the junction capacitance of the storage element, since the junction capacitance varies with the amount of charge. I have further disclosed how the storage array of my invention can be reset either by an electronic source or by a source of light.

While the invention has been particularly shown and described with reference to preferred embodiments, it will be understood by those skilled in the art that various changes in form and detail may be made therein without departing from the spirit and scope of the invention.

I claim:

1. A storage matrix for storing digital signals in digital data storage systems comprising:

a plurality of storage elements, each including a first diode pair having each diode connected at its cathode forming a junction; and a second pair of diodes each connected at its anode and also connected to the junction of said first diode pair;

means for inserting digital information in said matrix by charging selected one of said storage elements, thereby varying the capacitance value of said storage elements; and sensing means for detecting the capacitive value of any one of said storage elements, thereby detecting the particular digital information in said storage elements.

2. A volatile storage matrix comprising:

a first plurality of parallel conductors arranged in pairs;

a second plurality of parallel conductors placed in a substantially perpendicular relationship to and insulated from said first plurality of conductors;

two chargeable storage elements connected between each of said second plurality of conductors and a corresponding pair of said first plurality of conductors;

means for charging each of said two chargeable storage elements to a different level of voltage, thereby causing the storage element with the higher voltage of the two to have the lower capacitance of the two;

means for activating the second plurality of parallel conductors thereby coupling a signal of differing amplitude through each of said storage elements to each one of said pair of first plurality of parallel conductors; and sensing means responsive to the difference in the signal level between each of a pair of said first plurality of parallel conductors, said difference being indicative of a digital "one" or "zero."

3. Apparatus as in claim 2 further comprising:

resetting means for activating the second plurality of parallel conductors causing each of said storage elements to discharge and thereby assume a similar junction voltage and a similar value of capacitance.

4. An apparatus as in claim 3 wherein the resetting means activates the second plurality of parallel conductors with a signal having a polarity opposite to the polarity of the signal used for charging and sensing said storage elements.

5. An apparatus as in claim 3 wherein the resetting means is a source of light.

6. An apparatus as in claim 5 wherein the source of light is shined on only selected pairs of said storage elements thereby selectively discharging said storage matrix.

7. A volatile storage matrix for storing digital signals comprising:

a first plurality of parallel conductors, one per bit of information to be stored;

a second plurality of parallel conductors placed in a substantially perpendicular relationship to and insulated from said first plurality of conductors, one for each word of information to be stored;

a plurality of storage elements, one connected between each of said first and second plurality of conductors, each storage element having external connections to only two terminals and being comprised of diodes connected in series back-to-back;

means for charging a predetermined plurality of said storage elements, thereby varying the capacitance of said storage elements; and sensing means for detecting said difference in capacitance of said storage elements.

8. A volatile storage matrix for storing digital signals comprising:

a first plurality of parallel conductors, one more than the number of bits of information to be stored, at least two bits to be stored;

a second plurality of parallel conductors placed in a substantially perpendicular relationship to and insulated from said first plurality of conductors, one for each word of information to be stored;

a plurality of storage elements, one connected between each of said first and second plurality of conductors;

means for charging a predetermined plurality of said storage elements, thereby varying the capacitance of said storage elements; and sensing means for detecting said difference in capacitance of said storage elements, said housing means comprising:

differential amplifiers connected between adjacent ones of said first plurality of conductors, whereby each conductor of said first plurality of conductors, except two, is connected to two differential amplifiers, digital information stored being determined by the relative amount of charge in adjacent ones of said plurality of storage elements along a single one of said second plurality of conductors.

9. In digital data storage systems, a storage array for storing digital signals comprising:

a plurality of storage elements, each storage element having external connections to only two terminals and being comprised of diodes connected in series back-to-back, each storage element for the storage of one bit of digital information;

means for inserting digital information in said array by charging selected ones of said storage elements; and sensing means for detecting the amount of charge on any one of said storage elements, thereby detecting the particular digital information in said storage elements.

10. An apparatus as in claim 9 wherein two of said plurality of diode pairs are utilized for the storage of one bit of digital information.

11. In digital data storage systems, a storage array for storing digital signals comprising:

a plurality of diode pairs, each for the storage of one bit of digital information, one of the diodes in each of said diode pairs having a capacitance at least three times that of the other diode;

means for inserting digital information in said array by charging selected ones of said diode pairs; and sensing means for detecting the amount of charge on any one of said diode pairs, thereby detecting the particular digital information in said diode pairs.

References Cited

UNITED STATES PATENTS

| | | | |
|---|---|---|---|
| 3,070,779 | 12/1962 | Logue | 340—166 |
| 3,109,163 | 10/1963 | Mueller | 340—173 |
| 3,174,134 | 3/1965 | Steinbuch et al. | 340—166 |
| 3,181,131 | 4/1965 | Pryor | 340—173X |
| 3,391,395 | 7/1968 | Chen | 340—173 |

TERRELL W. FEARS, Primary Examiner

U.S. Cl. X.R.

307—320